US006429367B2

(12) United States Patent
Fishman

(10) Patent No.: US 6,429,367 B2
(45) **Date of Patent: *Aug. 6, 2002**

(54) COAXIAL MUSICAL INSTRUMENT TRANSDUCER

(75) Inventor: Lawrence R. Fishman, Winchester, MA (US)

(73) Assignee: Fishman Transducers, Inc., Wilmington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/862,087

(22) Filed: May 21, 2001

Related U.S. Application Data

(63) Continuation of application No. 09/346,720, filed on Jul. 2, 1999, now Pat. No. 6,239,349.

(60) Provisional application No. 60/091,742, filed on Jul. 6, 1998.

(51) Int. Cl.[7] .................................................. G01H 3/14

(52) U.S. Cl. ........................ 84/730; 84/723; 84/DIG. 24

(58) Field of Search ........................... 84/723, 730–731, 84/733, DIG. 24

(56) References Cited

U.S. PATENT DOCUMENTS

| | | | | |
|---|---|---|---|---|
| 4,356,754 A | | 11/1982 | Fishman | 84/1.16 |
| 4,378,721 A | | 4/1983 | Kaneko et al. | 84/1.14 |
| 4,491,051 A | | 1/1985 | Barcus | 84/1.16 |
| 4,727,634 A | | 3/1988 | Fishman | 29/25.35 |
| 4,774,867 A | | 10/1988 | Fishman | 84/1.16 |
| 4,785,704 A | | 11/1988 | Fishman | 84/1.16 |
| 4,911,057 A | | 3/1990 | Fishman | 84/731 |
| 4,944,209 A | | 7/1990 | Fishman | 84/731 |
| 4,975,616 A | | 12/1990 | Park | 310/339 |
| 5,029,375 A | | 7/1991 | Fishman | 29/25.35 |
| 5,155,285 A | | 10/1992 | Fishman | 84/731 |
| 5,189,771 A | | 3/1993 | Fishman | 29/25.35 |
| 5,319,153 A | | 6/1994 | Fishman | 84/731 |
| 5,463,185 A | | 10/1995 | Fishman | 84/731 |
| 5,670,733 A | | 9/1997 | Fishman | 84/731 |
| 5,817,966 A | | 10/1998 | Fishman | 84/731 |
| 6,239,349 B1 | * | 5/2001 | Fishman | 84/731 |

* cited by examiner

*Primary Examiner*—Marlon T. Fletcher
(74) *Attorney, Agent, or Firm*—Weingarten, Schurgin, Gagnebin & Lebovici LLP

(57) ABSTRACT

A transducer for a stringed musical instrument utilizes a coaxial structure. A thin layer of a piezoelectric polymer material is extruded about an inner, electrically conductive core. An outer conductor is formed about the piezoelectric polymer material. Polarization of the piezoelectric polymer material is accomplished in conjunction with the extrusion process. The piezoelectric polymer material has an optimized thickness for consistent responsiveness across a desired range of input stimuli, and is capable of maintaining the integrity of the transducer over time. The transducer configured for placement underneath the saddle in a bridge of a stringed musical instrument.

24 Claims, 3 Drawing Sheets

COAXIAL MUSICAL INSTRUMENT TRANSDUCER

CROSS REFERENCE TO RELATED APPLICATIONS

This application is a continuation of prior application No. 09/346,720, filed Jul. 2, 1999, entitled: COAXIAL MUSICAL INSTRUMENT TRANSDUCER, now U.S. Pat. No. 6,239,349, which claims benefit to U.S. Provisional Application No. 60/091,742 filed Jul. 6, 1998.

STATEMENT REGARDING FEDERALLY SPONSORED RESEARCH OR DEVELOPMENT

N/A

BACKGROUND OF THE INVENTION

The present invention relates in general to a musical instrument transducer. More particularly, it relates to a piezoelectric transducer used with a stringed musical instrument such as a guitar.

The prior art shows a variety of electromechanical transducers employed with musical instruments, particularly guitars. Many of these transducers are not completely effective in faithfully converting mechanical movements or vibrations into electrical output signals which precisely correspond to the character of the input vibrations. This lack of fidelity is primarily due to the nature of the mechanical coupling between the driving vibrating member (i.e. a string) and the piezoelectric material of the transducer. Some of the prior art structures, such as those shown in U.S. Pat. Nos. 4,491,051 and 4,975,616, are also quite complex in construction and become quite expensive to fabricate. Furthermore, a transducer using a piezoelectric material requires a conductive layer, a ground layer, and some form of shielding to prevent electrical interference. These multiple layers not only increase the complexity of the transducer, but interfere with the ability to attach leads to the transducer as it is made smaller to operate in a musical instrument.

Differently shaped transducers have been produced for musical instruments. Generally, transducers for stringed instruments have a flat, elongated shape. The piezoelectric layer for such transducers can also be elongated, or can be individual crystals between electrodes. Alternatively, one prior art transducer was coaxially arranged, with a center electrode, surrounding piezoelectric layer, and outer electrode, as illustrated in U.S. Pat. No. 4,378,721.

Each shape offers unique difficulties in construction and varying degrees of quality in operation and performance. For good performance, the piezoelectric layer needs to respond to small string movements at a variety of frequencies. With a thicker layer of piezoelectric material, the material needs to be more flexible; if made too thick, the piezoelectric layer may be too brittle for the intended use, and may not provide satisfactory response characteristics across of range of input stimuli including the smallest string movements. To achieve sufficient resilience in a coaxial arrangement, U.S. Pat. No. 4,378,721 discloses a material formed from a rubber material mixed with a powdered piezoelectric ceramic and a vulcanizing or cross-linking agent. Piezoelectric ceramic is typically brittle and inflexible. This reference relies upon a rubber matrix to bind together the powdered ceramic material. The use of a rubber material results in a significantly thicker piezoelectric material layer, which is inconsistently responsive across a variety of input frequencies; the rubber matrix tends to damp input stimuli, resulting in degraded response. A thicker piezoelectric layer, even if comprised of rubber, becomes more difficult to physically accommodate, to bend or to otherwise manipulate. Over time, it has been found that the composite piezoelectric layer such as described in this reference tends to deform in response to compression such as is typical in a stringed instrument application.

A further disadvantage of the coaxial transducer as described in U.S. Pat. No. 4,378,721 relates to its formation through a casting or molding process, such that the length of the resulting transducer is dependent on the size of the molds available. Other manufacturing processes are not suitable for the composite piezoelectric material due to a low degree of cohesiveness.

Additionally, the polarization of the piezoelectric material of this reference must be performed after completion of the casting procedure. Two opposing, plate-like electrodes, on either side of the transducer, are used to initialize the magnetic domains of the piezoelectric material, thereby complicating and extending the manufacturing process of such a transducer. Therefore, a need exists for an accurate, responsive transducer with a thin, relatively stiff piezoelectric layer which can be economically formed into a coaxial arrangement.

BRIEF SUMMARY OF THE INVENTION

The deficiencies of the prior art are substantially overcome by the transducer according to the present invention, which includes a coaxial structure having a central conductor, a piezoelectric polymer layer, and an outer conductor. The central conductor may be formed of a wire bundle or a solid wire. A piezoelectric cylinder of either a piezoelectric copolymer or a monopolymer is formed about the central conductor. The piezoelectric material may be substantially thinner than that of the prior art, thus providing significantly improved response characteristics for the output signal, while providing a desired degree of flexibility and resistance to deformation over time.

The outer conductor can be formed as a braided sheath or simply as a conductive paint on the outside of the piezoelectric material. Other embodiments include the use of conductive foil, conductive shrink tubing, or any other flexible, conductive material which has a minimal impact on the flexibility of the overall transducer and on the response characteristics of the piezoelectric material. An additional mechanically shielding layer may also be provided, though this layer must not significantly interfere with the responsiveness of the transducer. Leads are attached to the central and outer conductors in order to complete the transducer. The coaxial transducer may be provided with a length sufficient to fit within the saddle of a guitar, underneath the strings. Other embodiments may be configured for use with other stringed musical instruments.

BRIEF DESCRIPTION OF THE SEVERAL VIEWS OF THE DRAWING

This invention is pointed out with particularity in the appended claims. The above and further advantages may be more fully understood by referring to the following description and accompanying drawings, of which:

DETAILED DESCRIPTION OF THE INVENTION

Figure 1:
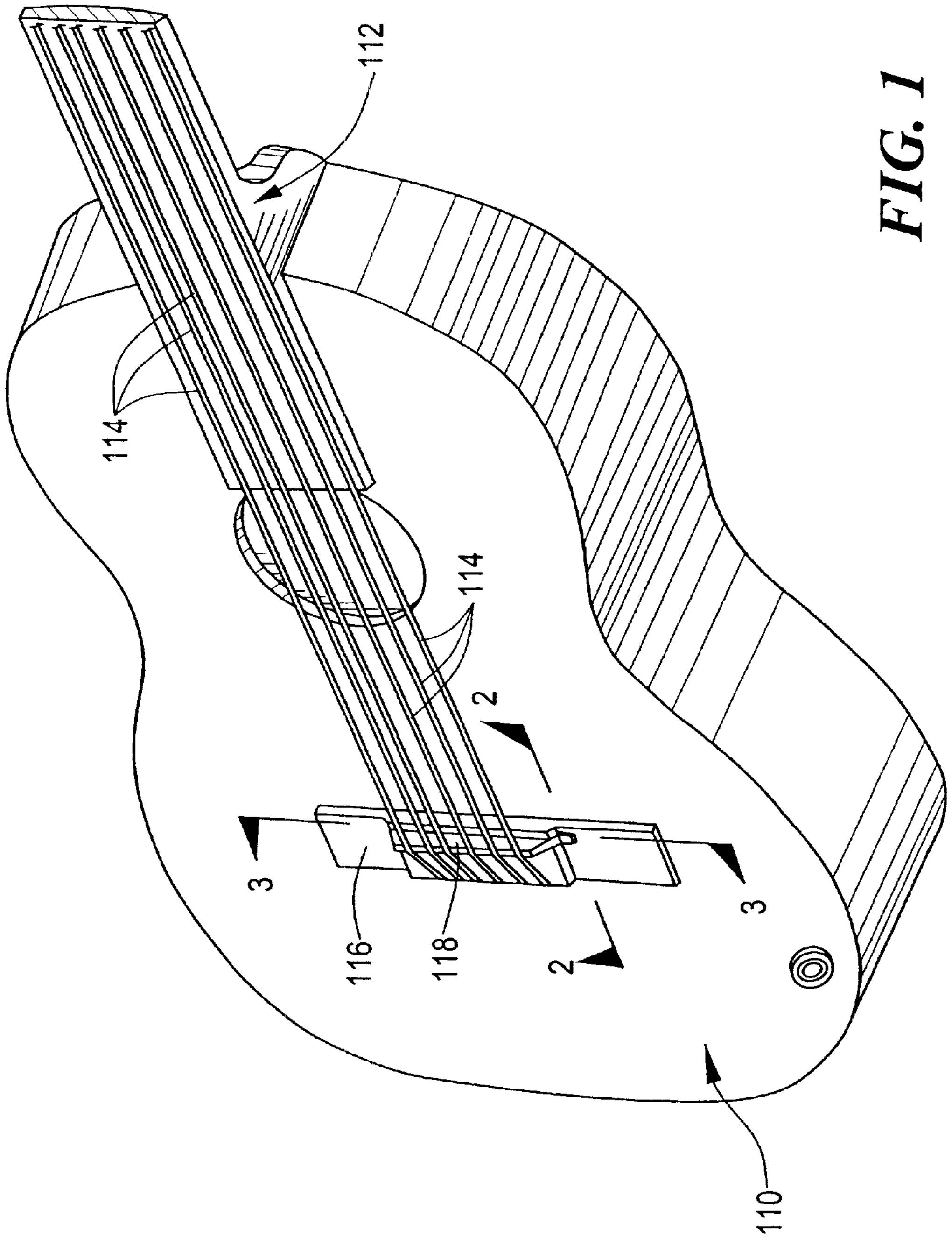
FIG. 1 is a perspective view of a stringed musical instrument, in particular guitar, that has incorporated therein the transducer of the present invention.
Figure 2:
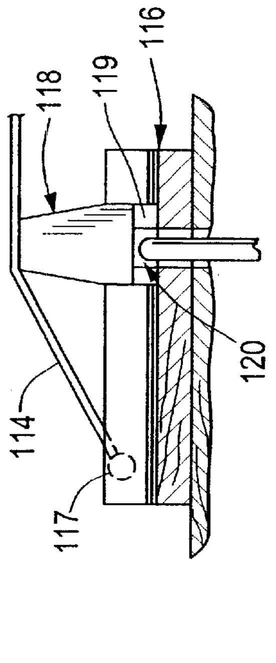
FIG. 2 is a cross-sectional view taken along by 2—2 of FIG. 1.
Figure 3:
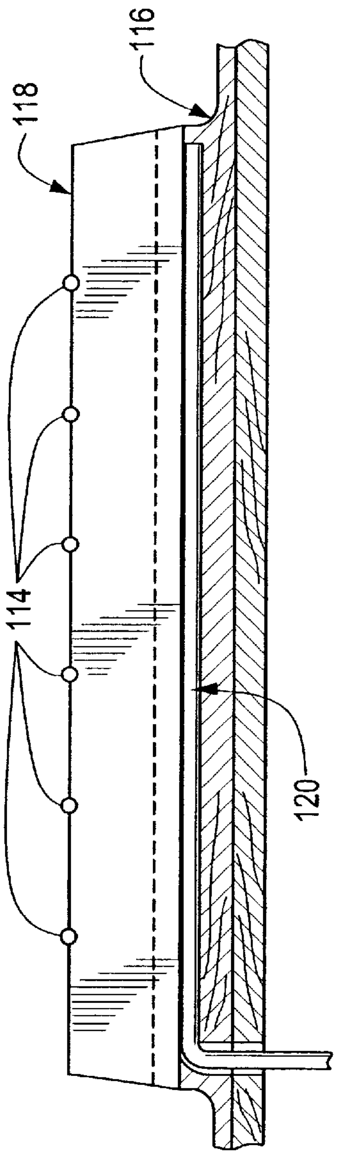
FIG. 3 is a cross-sectional view taken along line 3—3 of FIG. 1.

FIG. 1 illustrates a guitar that is comprised of a guitar body 110 having a neck 112 and supporting a plurality of strings 114. In the embodiment disclosed herein, as illustrated in FIG. 3, there are six strings 114. The strings 114 are supported at the neck end of the instrument (not shown). At the body end of the strings, the support is provided by a bridge 116. The bridge 116 includes a mechanism, such as illustrated in FIG. 2, for securing the end 117 of each of the strings 114. The bridge 116 is slotted, such as illustrated in FIG. 2, in order to receive a saddle at 118. The strings 114 are received in notches in the saddle 118 at the top surface.

FIGS. 2 and 3 illustrate cross-sectional views of the bridge and saddle with the positioning of the transducer of the present invention. The transducer 120 is positioned within the bridge underneath the saddle. As illustrated in FIG. 3, the transducer extends below the entire saddle underneath each of the strings of the instrument. In one embodiment, a portion of the transducer, when fully installed under the saddle, is bent towards and into the interior of the instrument, where conductive leads are attached for communicating the output signal to appropriate signal conditioning and/or amplifying circuitry (not shown). In this embodiment, installation of the transducer is achieved by feeding a free end of the transducer, opposite the conductive leads, into an opening in the interior of the guitar, beneath the bridge, until the transducer extends under the length of the saddle.

Figure 4:
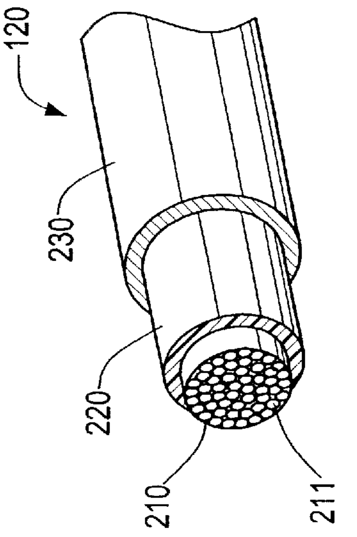
FIG. 4 is a cut-away view of the structure of the transducer according to the present invention.

The structure of the transducer is illustrated in FIG. 4. The transducer of the present invention is formed of an inner conductor 210, a piezoelectric polymer layer 220, and outer conductive layer 230. The inner conductor in the illustrated embodiment is formed of a conductive material having cylindrical or substantially cylindrical shape. It may be a single wire (not shown) or a twisted bundle of a plurality of individual wires 211. Such a bundle may further include non-conductive elements (not shown) useful for increasing the volume or rigidity of the inner conductive core 210; while it is preferable that the transducer of the present invention be sufficiently flexible that it can easily conform to irregular surfaces under the saddle and can be bent for facilitating installation within a bridge, it may also be useful for the transducer to exhibit a degree of mechanical rigidity as well. According to one embodiment, the inner conductor 210 has a diameter of approximately 0.075 to 0.080 inches.

A layer of a piezoelectric polymer material 220 is formed about the inner conductor 210. In one embodiment, the piezoelectric material is formed to have a thickness less than the diameter of the central conductor. In particular, a further embodiment provides the piezoelectric material having a thickness less than half the diameter of the inner conductor. According to a specific variant of this embodiment, the piezoelectric material has a thickness between approximately 0.010 and 0.015 inches. However, in other embodiments, central conductors are employed which are of such dimensions that the piezoelectric layer is as large as or larger than that of the central conductor.

The piezoelectric material is more accurately termed a piezoelectric polymer. The material is an amorphous structure containing many thousand individual crystals, which is constructed by combining different polymeric elements and subjecting them to high temperatures. This forms a fused material containing thousands of crystals. The piezoelectric polymer used in this invention may be a polyvinylidene fluoride (PVDF) copolymer. Alternatively, it may be a PVDF homopolymer. PVDF homopolymers are described in U.S. Pat. No. 4,975,616. PVDF copolymers can include, but are not limited to, vinylidene/tetrafluorethylene and vinylidene/trifluoroethylene polymers. The use of a thin layer of a piezoelectric polymer with a stiffer conductor provides the desired resilience for acceptable outputs from the transducer in a musical instrument and a desired, even responsiveness to a broad range of input frequencies without mechanical loss due to damping. The piezoelectric polymer is sufficiently resilient to offer the desired flexibility without the need for a rubberized matrix, and is resistant to compressive forces over time, such that the original transducer shape is maintained. Polymer materials as used in the presently disclosed transducers also tend to resist becoming brittle over time.

Around the piezoelectric polymer material, an outer conductive layer 230 is formed. The outer conductor 230 may be a braided sheath of wires. Alternatively, the outer conductor may simply be a conductive paint applied to the outer surface of the piezoelectric material. Further embodiments include the use of other flexible, conductive materials, including conductive foil, conductive shrink tubing, or other similar materials. The outer conductor 230 also forms a shield about the transducer. Conductive leads (not shown) are attached to the inner conductor 210 and the outer conductor 230 for providing signals from the transducer. The manner of attaching these leads can be according to state of the art practices with respect to coaxial cables outside the field of transducers. The conductive leads are preferably shielded to avoid the introduction of noise.

Figure 5:
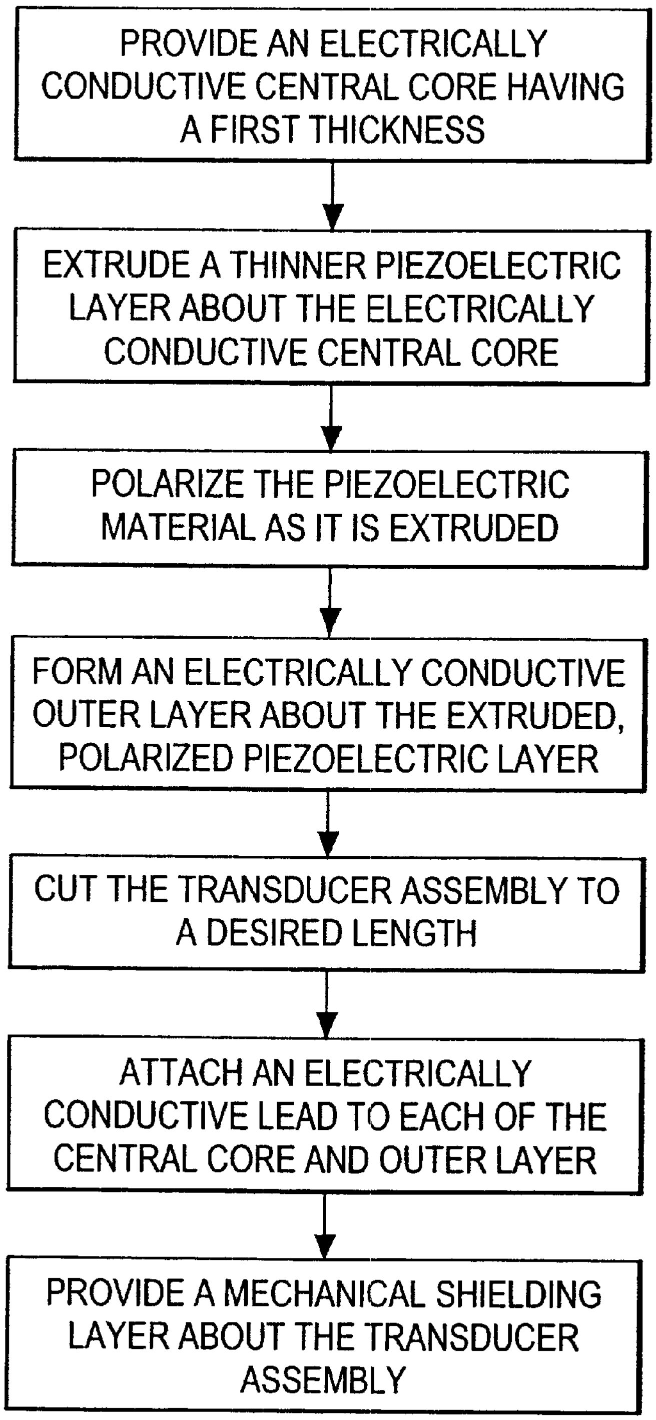
FIG. 5 illustrates a procedure for fabricating a transducer according to the present disclosure.

With reference to FIG. 5, a transducer according to one embodiment of the present disclosure is fabricated according to the following procedure. An electrically conductive central core is provided. Extrusion tools as known to one skilled in the art are employed in forming the piezoelectric polymer material layer about the central core. As part of the same process, the outer conductive layer is formed about the piezoelectric layer. The exact process for application of the outer layer depends upon the material chosen: conductive paint may be sprayed; conductive foil may be wrapped; conductive mesh may be woven.

As part of the extrusion process for this transducer, electrodes may be provided to polarize the piezoelectric polymer material as it is extruded. For instance, exposure to a DC field results in substantial alignment of the magnetic domains within the piezoelectric material. Once so aligned, the piezoelectric material is capable of generating a detectable potential when subject to the stresses to be monitored, in this case, the vibration of strings on a guitar or other musical instrument. Thus, a transducer according to the present disclosure may be fabricated to any length desired and simultaneously polarized, eliminating waste and simplifying the manufacturing process. The exact order of the steps of FIG. 5 may be rearranged in order to accommodate preferred manufacturing practices.

In alternative embodiments of the present disclosure, the cross-section of the resulting transducer is not perfectly round, but may be symmetrically or asymmetrically ovoid. Further, one or more sides of the transducer cross-section may be flat. For instance, the transducer assembly may have a rectangular cross-section. The choice of cross-sectional configuration may depend upon the environment into which the transducer is to be installed and any apertures through which the transducer must pass in order to reach its operating position. It is preferred in one embodiment that the central conductor have a diameter or thickness which is greater than the maximum thickness of the surrounding piezoelectric layer, regardless of cross-sectional configuration. Appropriate extrusion tooling is employed for these various configurations. Flexibility in determining transducer length through an extrusion process is maintained.

Further layers may be incorporated into the transducer as presently disclosed. For instance, it may be desirable to incorporate a mechanical shielding layer over the outer conductive layer. However, care must be exercised in selecting a shield material which protects the outer conductor without compromising the responsiveness of the piezoelectric material.

Having described at least one embodiment, it should now be apparent to those skilled in the art that numerous other modifications and changes can apply to this invention. Specifically, variations in the dimensions listed herein are contemplated. Additionally, while a transducer according to the present invention has been described for use with an acoustic guitar, the transducer may be utilized with other stringed instruments such as, without limitation, violas, pianos, or electric guitars. Such modifications and changes are contemplated as falling within the scope of the invention, which is limited solely by the pending claims.

What is claimed is:

1. A musical instrument transducer comprising an inner conductor comprising electrically conductive material;

a piezoelectric polymer layer about the inner conductor, wherein the thickness of the piezoelectric polymer layer is less than half the thickness of the inner conductor; and an outer conductor, comprising electrically conductive material, disposed about the piezoelectric layer.

2. The musical instrument transducer of claim 1, further comprising electrically conductive leads connected to the inner conductor and the outer conductor.

3. The musical instrument transducer of claim 1, wherein the inner conductor has a thickness of between 0.075 and 0.08 inches.

4. The musical instrument transducer of claim 1, wherein the piezoelectric polymer layer has a thickness of between 0.010 and 0.015 inches.

5. The musical instrument transducer of claim 1, wherein the piezoelectric polymer layer is formed from one of a piezoelectric copolymer and piezoelectric homopolymer.

6. The musical instrument transducer of claim 1, wherein the inner conductor is a twisted bundle of wires.

7. The musical instrument transducer of claim 1, wherein the inner conductor is a solid, electrically conductive material.

8. The musical instrument transducer of claim 1, wherein the outer conductor is an electrically conductive ink formed on an outer surface of the piezoelectric polymer layer.

9. The musical instrument transducer of claim 1, wherein the outer conductor is an electrically conductive foil disposed on an outer surface of the piezoelectric polymer layer.

10. The musical instrument transducer of claim 1, wherein the outer conductor is an electrically conductive shrink tube disposed on an outer surface of the piezoelectric polymer layer.

11. The musical instrument transducer of claim 1, wherein the outer conductor is a braid of electrically conductive filaments disposed on an outer surface of the piezoelectric polymer layer.

12. The musical instrument transducer of claim 1, wherein said transducer has a substantially circular cross-section.

13. The musical instrument transducer of claim 1, wherein said transducer has a substantially rectangular cross-section.

14. The musical instrument transducer of claim 1, wherein said inner conductor further comprises a non-conductive filler material.

15. The musical instrument transducer of claim 1, further comprising a mechanically shielding layer disposed about said outer conductor.

16. A method of fabricating a musical instrument transducer, comprising the steps of:

providing an electrically conductive central core;

providing a piezoelectric polymer layer about said electrically conductive central core, wherein said step of providing a piezoelectric polymer layer further comprises providing a piezoelectric polymer layer of a thickness less than one-half the thickness of said electrically conductive central core;

forming an electrically conductive outer layer about said piezoelectric layer to produce an assembly;

cutting said assembly to a desired length; and disposing electrically conductive leads in communication with said electrically conductive central core and said electrically conductive outer layer.

17. The method of claim 16, wherein said step of providing an electrically conductive central core further comprises providing an electrically conductive central core comprising at least one electrically conductive fiber.

18. The method of claim 17, wherein said step of providing an electrically conductive central core further comprises providing an electrically conductive central core comprising said at least one electrically conductive fiber in conjunction with at least one non-conductive fiber.

19. The method of claim 16, wherein said step of forming further comprises the step of braiding electrically conductive fibers about said piezoelectric polymer material.

20. The method of claim 16, wherein said step of forming further comprises the step of applying an electrically conductive foil about said piezoelectric polymer material.

21. The method of claim 16, wherein said step of forming further comprises the step of forming electrically conductive shrink tubing about said piezoelectric polymer material.

22. The method of claim 16, wherein said step of forming further comprises the step of applying an electrically conductive liquid on said piezoelectric polymer material and allowing said applied electrically conductive liquid to dry as said electrically conductive outer layer.

23. The method of claim 16, further comprising the step of disposing a mechanically shielding layer about said electrically conductive outer layer.

24. The method of claim 16, wherein said steps of providing an electrically conductive central core, providing a piezoelectric polymer layer, and forming an electrically conductive outer layer collectively result in a musical instrument transducer having a substantially circular cross-section.

* * * * *